(12) United States Patent
Hwang et al.

(10) Patent No.: US 12,236,360 B2
(45) Date of Patent: Feb. 25, 2025

(54) SHIFTLEFT TOPOLOGY CONSTRUCTION AND INFORMATION AUGMENTATION USING MACHINE LEARNING

(71) Applicant: INTERNATIONAL BUSINESS MACHINES CORPORATION, Armonk, NY (US)

(72) Inventors: Jinho Hwang, Ossining, NY (US); Larisa Shwartz, Greenwich, CT (US); Srinivasan Parthasarathy, White Plains, NY (US); Qing Wang, Chappaqua, NY (US); Michael Elton Nidd, Zurich (CH); Frank Bagehorn, Dottikon (CH); Jakub Krchák, Jindrichuv Hradec (CZ); Ota Sandr, Prague (CZ); Tomáš Ondrej, Prague (CZ); Michal Mýlek, Vrané nad Vltavou (CZ); Altynbek Orumbayev, Prague (CZ); Randall M George, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 811 days.

(21) Appl. No.: 17/023,679

(22) Filed: Sep. 17, 2020

(65) Prior Publication Data

US 2022/0083876 A1    Mar. 17, 2022

(51) Int. Cl.
*G06N 5/04*    (2023.01)
*G06N 20/00*   (2019.01)

(52) U.S. Cl.
CPC ............... *G06N 5/04* (2013.01); *G06N 20/00* (2019.01)

(58) Field of Classification Search
CPC ............ G06N 5/04; G06N 5/02; G06N 20/00; G06N 3/045; H04L 41/12; H04L 67/34; H04L 41/145; H04L 47/829; H04L 41/16
See application file for complete search history.

(56) References Cited

U.S. PATENT DOCUMENTS

| 8,473,928 B2 | 6/2013 | Park |
| 9,128,749 B1 * | 9/2015 | Wang .................. G06F 9/546 |

(Continued)

FOREIGN PATENT DOCUMENTS

| CN | 101040486 A | 9/2007 |
| CN | 101223524 A | 7/2008 |

(Continued)

OTHER PUBLICATIONS https://web[.]archive[.]org/web/20191220135212/https://en[.]wikipedia[.]org/wiki/Elasticsearch. Accessible Dec. 20, 2019. (Year : 2019).*

(Continued)

*Primary Examiner* — Oluwatosin Alabi
*Assistant Examiner* — Nicholas S Wu
(74) *Attorney, Agent, or Firm* — Steven M. Bouknight

(57) ABSTRACT

A method, a computer system, and a computer program product for a shiftleft topology construction is provided. Embodiments of the present invention may include collecting datasets. Embodiments of the present invention may include extracting topological entities from the datasets. Embodiments of the present invention may include correlating a plurality of data from the topological entities. Embodiments of the present invention may include mapping the topological entities. Embodiments of the present invention may include marking entry points for a plurality of subgraphs of the topological entities. Embodiments of the present invention may include constructing a topology graph.

19 Claims, 6 Drawing Sheets

(56) References Cited

U.S. PATENT DOCUMENTS

| | | | |
|---|---|---|---|
| 9,152,402 | B2 | 10/2015 | Scheidel |
| 10,346,338 | B2 | 7/2019 | Hamilton, II |
| 10,528,617 | B2 | 1/2020 | Poddar et al. |
| 11,516,310 | B2* | 11/2022 | Ge .................... G06F 8/36 |
| 2006/0080417 | A1 | 4/2006 | Boutboul et al. |
| 2007/0016592 | A1 | 1/2007 | Ferla et al. |
| 2011/0208567 | A9* | 8/2011 | Roddy ............ G06Q 10/0637 |
| | | | 705/305 |
| 2011/0286337 | A1 | 11/2011 | Olsson |
| 2014/0040279 | A1 | 2/2014 | Beygelzimer et al. |
| 2014/0169223 | A1 | 6/2014 | Kampmann et al. |
| 2015/0081883 | A1* | 3/2015 | Katz .................... G06F 9/5027 |
| | | | 709/224 |
| 2016/0105350 | A1 | 4/2016 | Greifeneder et al. |
| 2016/0124742 | A1 | 5/2016 | Rangasamy |
| 2017/0104636 | A1* | 4/2017 | Vora .................... G06F 8/65 |
| 2017/0286352 | A1 | 10/2017 | Kumar et al. |
| 2017/0337232 | A1* | 11/2017 | Caspi ............. G06F 16/2455 |
| 2018/0287876 | A1* | 10/2018 | Strobel ............. H04L 41/142 |
| 2018/0309637 | A1 | 10/2018 | Gill |
| 2018/0316568 | A1* | 11/2018 | Gill .................... H04L 43/067 |
| 2019/0005163 | A1 | 1/2019 | Farrell |
| 2019/0098106 | A1 | 3/2019 | Mungel |
| 2019/0356555 | A1 | 11/2019 | Bai |
| 2020/0177608 | A1 | 6/2020 | Okunlola |
| 2020/0259715 | A1 | 8/2020 | Schermann |
| 2021/0035661 | A1* | 2/2021 | Neumann ............ G16H 20/00 |
| 2021/0136178 | A1* | 5/2021 | Casey .................... G06F 9/505 |
| 2021/0149668 | A1* | 5/2021 | Gupta .................... G06F 9/547 |
| 2021/0392049 | A1* | 12/2021 | Jeuk .................... H04L 41/16 |
| 2022/0012633 | A1* | 1/2022 | Molahalli ........... G06F 18/2155 |
| 2022/0176201 | A1* | 6/2022 | Wehba .................... G06T 7/20 |

FOREIGN PATENT DOCUMENTS

| | | | |
|---|---|---|---|
| CN | 102308521 | A | 1/2012 |
| CN | 102725733 | A | 10/2012 |
| CN | 103577514 | A | 2/2014 |
| CN | 103636172 | A | 3/2014 |
| CN | 106982143 | A | 7/2017 |
| CN | 108322351 | A | 7/2018 |
| CN | 108701110 | A | 10/2018 |
| CN | 110472107 | A | 11/2019 |
| CN | 116210210 | A | 6/2023 |
| GB | 2613484 | A | 6/2023 |
| WO | 2022058919 | A1 | 3/2022 |

OTHER PUBLICATIONS

Ma, Shang-Pin, et al. "Using service dependency graph to analyze and test microservices." 2018 IEEE 42nd Annual Computer Software and Applications Conference (COMPSAC). vol. 2. IEEE, 2018. (Year: 2018).*

Ribeiro, Jose Lucas, et al. "A microservice based architecture topology for machine learning deployment." 2019 IEEE International Smart Cities Conference (ISC2). IEEE, 2019. (Year: 2019).*

Kotouza, Maria Th, Fotis E. Psomopoulos, and Pericles A. Mitkas. "A dockerized framework for hierarchical frequency-based document clustering on cloud computing infrastructures." Journal of cloud computing 9.1 (2020): 2. (Year: 2020).*

Cinque et al., "Advancing Monitoring in Microservices Systems", 2019 IEEE International Symposium on Software Reliability Engineering Workshops (ISSREW), 2019 IEEE, pp. 122-123.

Cockcroft, "Twitter microservices map looks just like the Netflix one. We called this the "Death Star" diagram. #qconlondon", https://twitter.com/adrianco/status/441883572618948608, Accessed on Apr. 3, 2020, 2 pages.

Penchikala et al., "Adoption of Cloud-Native Architecture, Part 1: Architecture Evolution and Maturity", https://www.infoq.com/articles/cloud-native-architecture-adoption-part1/, Accessed on Apr. 6, 2020, 20 pages.

Pina et al., "Nonintrusive Monitoring of Microservice-based Systems" 2018 IEEE, 8 pages.

Tankovic et al., "ElaClo: A Framework for Optimizing Software Application Topology in the Cloud Environment," Preprint submitted to Expert Systems with Applications, Jul. 10, 2017, 77 pages.

Wong, "The Case for Chaos", https://www.slideshare.net/brucewong3/the-case-for-chaos, Published on Dec. 19, 2014, SlideShare, 10 pages.

Mell et al., "The NIST Definition of Cloud Computing", Recommendations of the National Institute of Standards and Technology, Special Publication 800-145, Sep. 2011, 7 pages.

International Searching Authority, "Notification of Transmittal of the International Search Report and the Written Opinion of the International Searching Authority, or Declaration," Patent Cooperation Treaty, Nov. 25, 2021, 9 pages, International Application No. PCT/IB2021/058442.

Chinese Patent Office, "First Office Action issued", Apr. 27, 2024, 16 Pages, Application No. 202180055272.X.

\* cited by examiner

SHIFTLEFT TOPOLOGY CONSTRUCTION AND INFORMATION AUGMENTATION USING MACHINE LEARNING

BACKGROUND

The present invention relates generally to the field of computing, and more particularly to topology construction and machine learning. Microservices architecture can be implemented in a distributed manner using many different topologies. Some include using a centralized messaging topology, a representational state transfer (REST)-based topology and a representational state transfer application program interface (REST-API)-based topology.

SUMMARY

Embodiments of the present invention disclose a method, a computer system, and a computer program product for shiftleft topology construction. Embodiments of the present invention may include collecting datasets. Embodiments of the present invention may include extracting topological entities from the datasets. Embodiments of the present invention may include correlating a plurality of data from the topological entities. Embodiments of the present invention may include mapping the topological entities. Embodiments of the present invention may include marking entry points for a plurality of subgraphs of the topological entities. Embodiments of the present invention may include constructing a topology graph.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
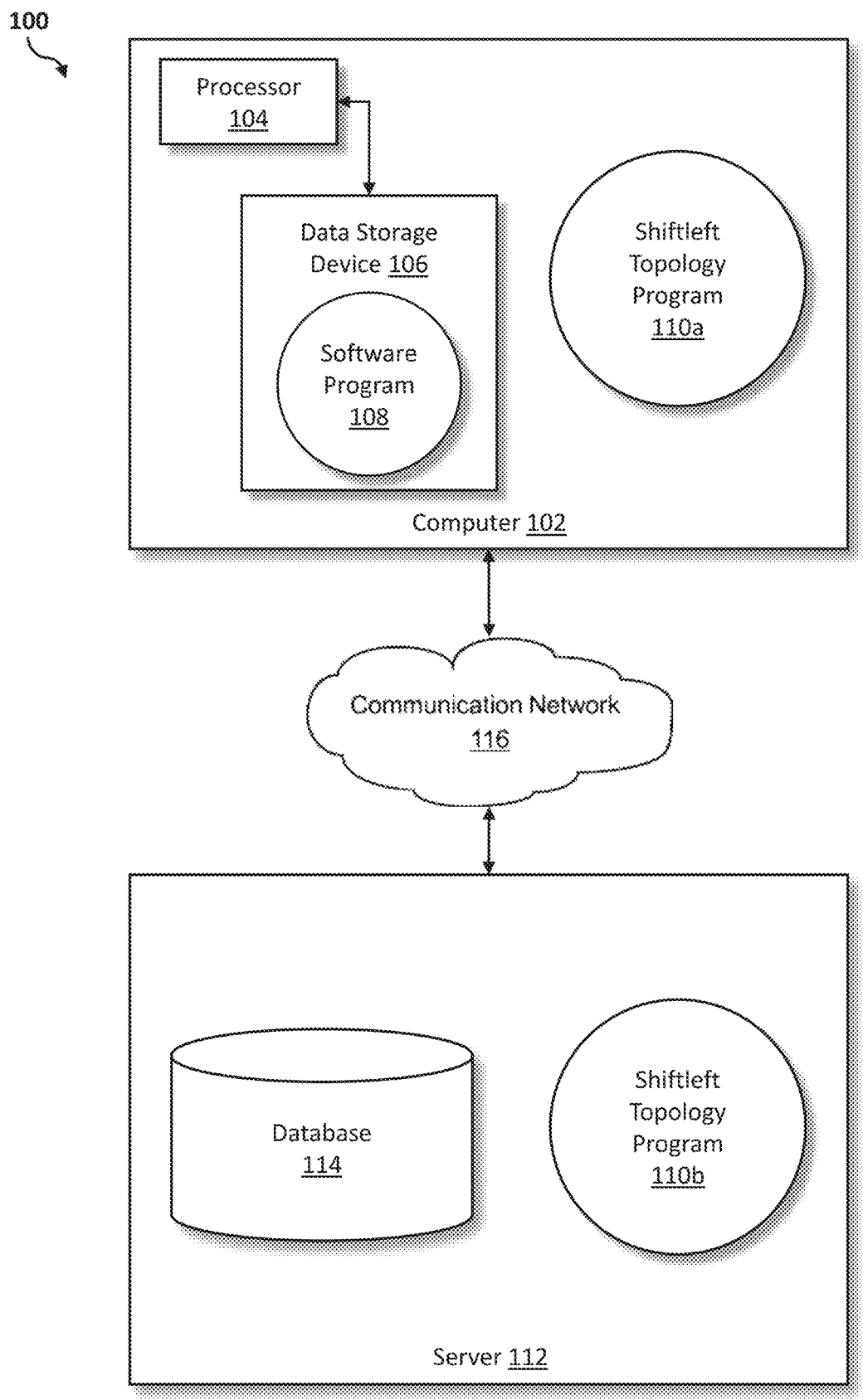
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, microservices architecture can be implemented in a distributed manner using many different topologies. Some include using a centralized messaging topology, a representational state transfer (REST)-based topology and a representational state transfer application program interface (REST-API)-based topology. Application program interface (API) that uses representational state transfer (REST) architecture may use hypertext transfer protocol (HTTP) requests to POST, DELETE, GET or PUT data. The application program interface (API) allows applications or software programs to communicate.

A microservice framework may be structured with smaller independent architectural components that operate at high speed. Microservices allow applications to be managed easier and allows the applications to be scalable. The independent components in a microservice framework may perform focused operations and the other independent components in the same microservice framework may operate using differing technologies. The independent scalability of microservices allows a service to offer multiple cloud-based products using a larger number of resources.

Many microservice frameworks operate using a container-based infrastructure. Containers may include isolated infrastructures that use a minimal amount of resources, share a host operating system and are simple to integrate. Containers also allow for minimal software configuration since the container may use, for example, the same software code in a delivery pipeline. A differing container may operate within the same microservice framework and operate on an alternate software code with minimal configuration. An application program interface (API) may include a set of functions or a communication protocol that allows, for example, the container to access data on a virtual machine, an operating system, a service or an application.

Topology information or topology data obtained from microservices is essential for the microservices management stack and analytics, however, in a microservices or container framework, a common component may not exist to construct a topology without deploying the entire microservices. For example, building a topology of 500 or more microservices is a major task during runtime. Microservices are deployed together with distributed tracing tools and service mesh tools to construct a topology and additional information can be added, such as latency, application program interface (API) connections and overall resource consumption. A distributed tracing tool may include, for example, Jaeger, an open source software that performs an end-to-end distributed tracing. A service mesh tool may include, for example, Istio, an open source software that helps to create a load balanced network of deployed services.

The topology information is constructed incrementally as the microservices system reports data. Thus, the management tools, such as the distributed tracing and the service mesh tools, use the incrementally constructed topology information as the data is reported, however, the management tools are not able to function property until the entire topology is constructed. Additionally, analytics services in microservice frameworks typically require the topology information before deploying the entire services, especially when training offline. Therefore, it may be advantageous to, among other things, create a system, method and program product to continuously monitor information changes to a microservices framework, update topology graphs and predict dependencies between microservices.

The following described exemplary embodiments provide a system, a method and a program product for topology construction using machine learning. As such, embodiments of the present invention have the capacity to improve the technical field of microservices topology construction by using machine learning to learn operational characteristics of microservices in a microservice framework using static and dynamic information. More specifically, machine learning is used to learn operational characteristics from data, such as logs, communication transmissions, documentation and subject matter expert (SME) input and feedback to predict topology graphs that can be used by analytics services and by users.

According to an embodiment, shiftleft analysis and machine learning may be used for constructing a microservice topology and to validate the topology information. Shiftleft analysis may be obtained from source code and may include, for example, deployment configurations, deployment specifications or environmental variables to augment more in-depth data for the construction of topology. One aspect of machine learning may be used to construct a topology of microservices by analyzing deployment configurations or specifications without runtime information or by analyzing offline. An offline analysis may provide information that can be used to extract performance estimations to construct a topology.

According to an embodiment, various types of machine learning (ML) models may be built and used to create predictive results for constructing topologies for services and microservices. Data or information from different domains that provide services and microservices may be obtained to construct topologies. Domains may include, for example, retail, entertainment, social media, business, technology, medical, academic, government, industrial, food chain, legal or automotive. Machine learning (ML) models may also include deep learning models and artificial intelligence (AI). Training and updating a machine learning (ML) model may include supervised, unsupervised and semi-supervised machine learning (ML) procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

Supervised learning and semi-supervised learning may incorporate feedback or ground truth by having an individual check the accuracy of the data, data labels and data classifications. Individuals are typically a subject matter expert (SME) who has extensive knowledge in the particular domain of the dataset. The subject matter expert (SME) input may represent ground truth for the machine learning (ML) model and the provided ground truth may raise the accuracy and the predictive capabilities of the model. The subject matter expert (SME) may correct, amend, update or remove the classification of the data or data labels by manually updating the labeled dataset. Using a subject matter expert (SME) to provide feedback to the model may improve the accuracy of the model as datasets are updated or corrected.

According to an embodiment, the supervised or semi-supervised machine learning (ML) may be used to allow an individual (e.g., a user, an expert or an administrator) to have some improving effect over the training of a model by having the ability to validate, alter, update or change the training set. Experts may provide input or feedback into a model by altering the training set as opposed to an unsupervised machine learning (ML) environment, when a user may not provide input to the data. The training set of data may include parameters of a classifier or a label for learning purposes and a supervised or semi-supervised machine learning (ML) environment may allow the user to update the labels or classifiers of the training set.

Cognitive analyses, such as natural language processing (NLP) and semantic analysis, may be used during the building and training of a model. The cognitive analytics may analyze both structured and unstructured data to be incorporated into the machine learning (ML) process. Natural language processing (NLP) may be used to analyze the quality of data or feedback that is received for training and model building. Structured data may include data that is highly organized, such as a spreadsheet, a relational database or data that is stored in a fixed field. Unstructured data may include data that is not organized and has an unconventional internal structure, such as a portable document format (PDF), an image, a presentation, a webpage, video content, audio content, an email, a word processing document or multimedia content.

The received data may be processed using natural language processing (NLP) to extract meaningful information for training and building a model. Semantic analysis may be used to infer the complexity, meaning and intent of the information or data received to identify dependencies of services in a microservice network. Semantic analysis may also consider syntactic structures of information at various levels to infer meaning to words, phrases, sentences and paragraphs of the received, collected or extracted data.

According to an embodiment, part of the framework for a shiftleft topology program may include collecting data, extracting entities, retrieving meta information, correlating the information and constructing a topology. Data or information collected may be used for analysis and training a model to improve microservices and microservice management. Data may be added to, stored on and obtained from one or more databases, repositories or corpora. For example, accessible data repositories may include databases that hold configuration data, test case data, open source data, DevOps pipeline logs and other static and dynamic information associated with microservices. Feedback, such as subject matter expert (SME) feedback, provided to a model that is being trained or that is fully trained may also be stored on one or more databases.

Some examples of collected data may include test documentation, automation data, deployment scripts, configuration parameters, data from Swagger, Travis logs or Jenkins logs. The data may be obtained from various sources. Other examples of collected data may be data received based on a microservice deployment, such as how often or how long users utilize the microservices. Some data may be received from devices such as internet of things (IoT) devices, global positioning systems (GPS), sensors, smart watches, smart phones, smart tablets, personal computers or automotive devices. The collected data or information may be used to create datasets for model training and model use. Some of the data collected may be considered static data, dynamic data or real-time data and the information may be widely available for microservice technologies and frameworks.

Microservice deployment, microservices or containers may have an average lifespan that reduces over time. Many microservices such as social media microservices have an average lifespan (i.e., amount of time a user accesses the service) of less than 5 minutes, thus, topology information may be abstracted at a high-level of information to ensure a continuous update of topology. Connectivity or dependencies may be constructed and updated between microservices using the abstracted information and an analysis may be provided without an actual deployment of the microservices. Semantic contexts of services and dependencies may be identified using the abstracted information and used to augment and update the constructed topology graph.

A use case example may include a microservice management system and an analytics component. For example, topology information may be used to train an analytics model for an alert grouping or localization. Topology information may also be used to validate and configure information and make deployment plans. Deployment specifications may be generated, such as SIG application or kube config. Fine-grained topology information (data), such as application program interface (API) upstream services, are essential for microservices operations. For example, microservices that consumers use rely on or depend on upstream services.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a shiftleft topology program 110a. The networked computer environment 100 may also include a server 112 that is enabled to run a shiftleft topology program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 4, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the shiftleft topology program 110a, 110b may interact with a database 114 that may be embedded in various storage devices, such as, but not limited to a computer/mobile device 102, a server 112, or a cloud storage service.

According to the present embodiment, a user operating a computer 102 or a server 112 may use the shiftleft topology program 110a, 110b (respectively) to construct a topology using shiftleft analysis and machine learning. The shiftleft topology method is explained in more detail below with respect to FIGS. 2 and 3.

Figure 2:
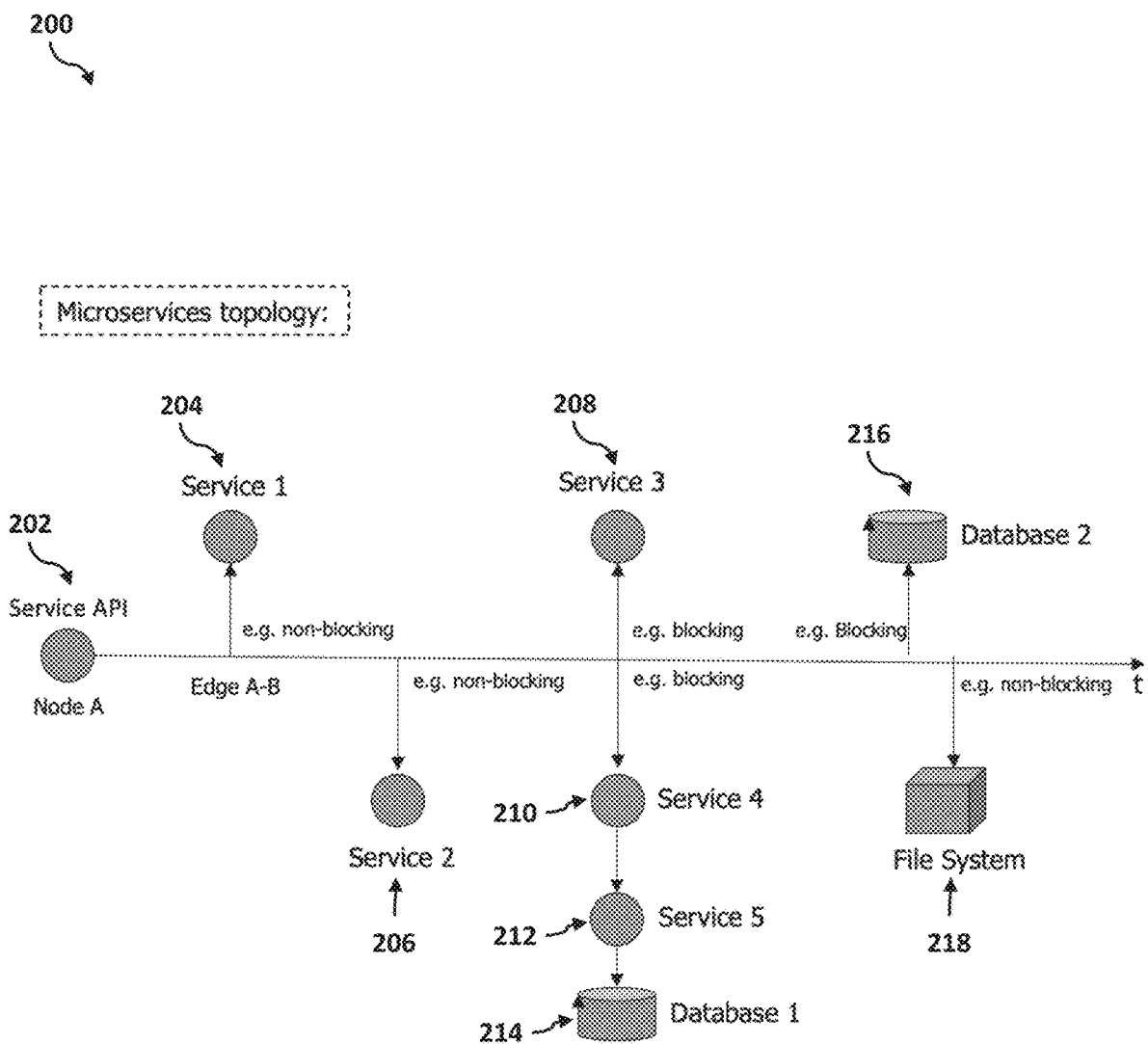
FIG. 2 is a block diagram example of a constructed microservices topology according to at least one embodiment.

Referring now to FIG. 2, a block diagram example of a constructed microservices topology 200 used by the shiftleft topology program 110a, 110b according to at least one embodiment is depicted. Topological entities are shown to be correlated to application program interface (API) routes. The microservices topology 200 shows an example result of mapping of topological entities to source code. The microservices topology 200 may represent a call graph that identifies the relationships of services, application program interface (API) connections and resource connections.

The service API 202 provides an interface that allows the services to interact, transmit data or receive data. Services 1-5 (204, 206, 208, 210 and 212, respectively) may represent services that are at application program interface (API) endpoints. Application program interface (API) endpoints for each microservice may include /auth,/login,/home,/search,/recommend or/member. For example, service 1 204 is/auth, service 2 206 is/get info, service 3 208 is/recommend, service 4 210 is/graph and service 5 212 is/nodes. The entity extraction and the application program interface (API) endpoints may form a call control graph or a call graph. A call graph may include a graph that represents the flow of calling relationships between computer programs.

Edge A-B is a directional connection from A to B, which refers to a message or a transmission being sent from A to B. Blocking or non-blocking may refer to an input-output (10) operation during the process of executing operations in the microservice framework. For example, blocking operations take a longer period of time to process since the operation waits for a response to return before moving to a next operation. Thus, a blocking operation may have a large impact on performance, such as latency. Non-blocking operations may be an efficient way to operate on a network and on storage to avoid the additional wait time required in blocking operations. For example, during the time a blocking operation waits for a response to proceed with an operation, other processes may operate and perform until the response returns to the blocking operation.

Databases 1-2 (214 and 216, respectively) may include databases that are special network storages that blocks one or more processes until a result, or a response is returned. File system 218 is an additional blocking device or system that holds the one or more processes until the results or response returns from the file system. The databases 1-2 and the file system 218 may be examples of blocking systems used by the shiftleft topology program 110a, 110b.

Figure 3:
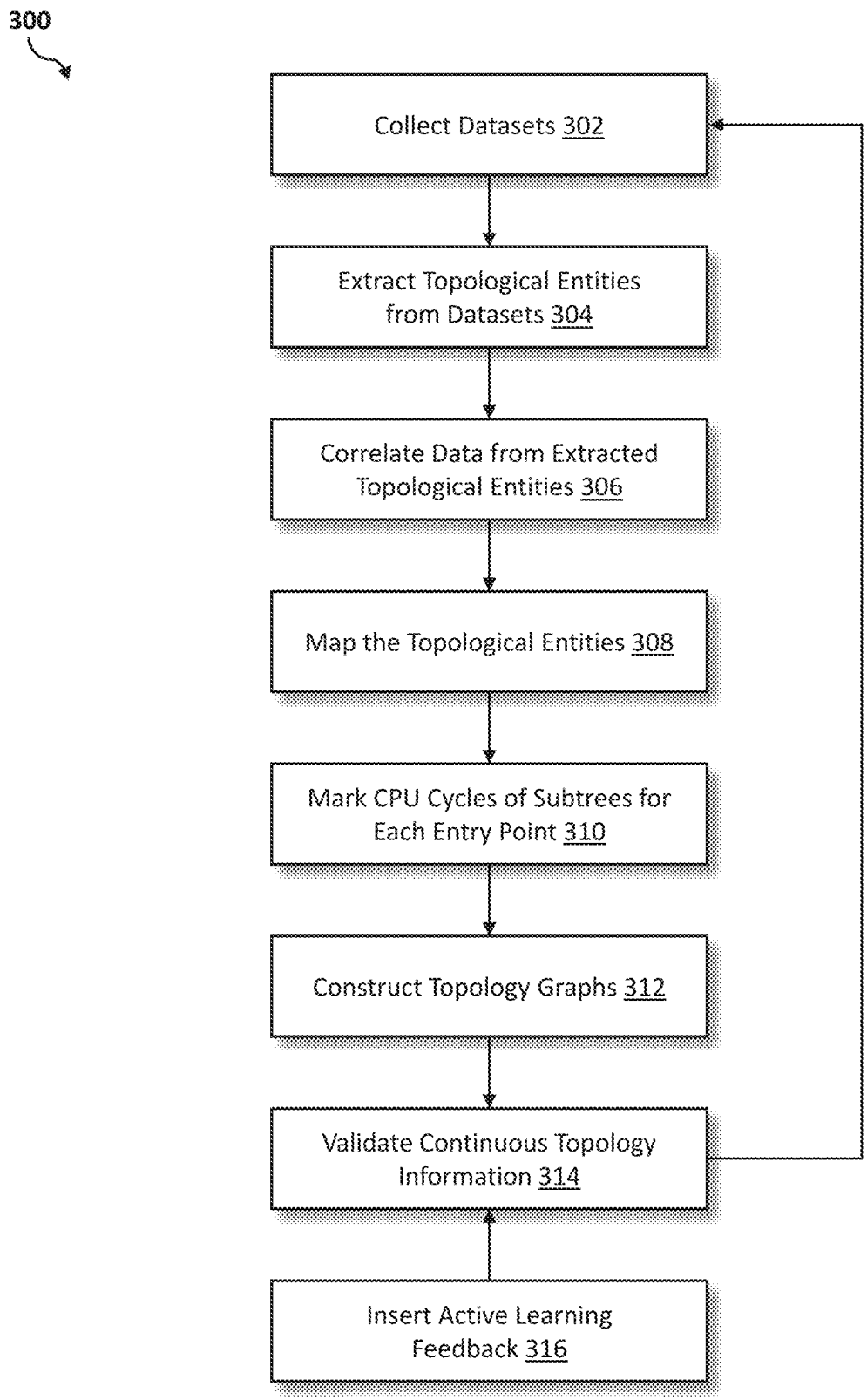
FIG. 3 is an operational flowchart illustrating a process for topology construction and information augmentation using machine learning according to at least one embodiment.

Referring now to FIG. 3, an operational flowchart illustrating the exemplary topology construction and information augmentation process 300 used by the shiftleft topology program 110a, 110b according to at least one embodiment is depicted.

At 302, datasets are collected. Static data and real-time data may be collected from and stored on one or more repositories (e.g., databases 1-2). Collected data may, for example, be static or dynamic information associated with microservices, such as configuration data, test case data, open source data or DevOps pipeline logs. Other examples of collected data may include test documentation, automation data, deployment scripts, configuration parameters, data from Swagger, Travis logs or Jenkins logs and the data is obtained from various source databases. Additional data may be collected based on microservice deployment information. Data collected may be used as datasets for multiple purposes, such as extracting data, building or training models, validation, building topological graphs and refining a built model using ground truth to update datasets.

At 304, topological entities are extracted from datasets. Entity extraction may include extracting topological entities from datasets, such as authorization entities, login entities, frontend entities, elastic search entities, graph database entities, recommendation entities or member entities related to a microservice network. The related topological entities may be accessed to extract authorization information, login information, frontend information, search information, recommendation information or member information. The entity extraction process, for example, uses a keyword search, language modeling or a simple field extraction to obtain endpoints for each related topological entity microservice. Reference FIG. 2 for an example of endpoints.

For each application, service or microservice, a top list of representative keywords is identified. The top list of representative keywords is based on an analysis of the distribution of words in the collected data for each topic. For example, for each microservice, topological keywords are identified from the collected datasets of documents and source code configurations. Based on the identified keywords and the microservices, an unsupervised model may be built and used to identify important or pertinent topics or names of the microservice. For example, topic modeling, clustering or Apriori models may be used to identify topics of the services.

For instance, the following representation may be used to extract keywords and identify pertinent topics.

$$P(\text{word} = Auth, \text{topic} = 1 \mid \theta_d, \beta_1) =$$
$$P(\text{word} = Auth \mid \text{topic} = 1, \beta_1) \, P(\text{topic} = 1 \mid \theta_d)$$

where $P(\text{word}=Auth|\text{topic}=1, \beta_1)$ represents each topic that has a distribution over words that are global across all documents or collected data and $P(\text{topic}=1|\theta_d)$ represents each topic that has a distribution over words that are local across all documents or collected data. An iterative method, such as estimation-maximization, may be used to iterate over the probability until convergence is achieved and the important topics are identified.

At 306, data is correlated from the extracted topological entities. Data may be correlated to match the same topological entities from different sources. A correlation of topological entities to application program interface (API) routes may be identified. Data may be correlated for each microservice application through the data retrieved for each application or from each application program interface (API), or both.

At 308, topological entities are mapped. The correlated data is mapped as a graph. For example, topological entities may be mapped to source code and relationships may be identified from the mapped topological entities, such as caller-callee and application program interface (API) routes. Topological entities that have not been called in any locations may be excluded. As an example, one application program interface (API) call may have multiple service calls in sequence or in parallel and blocking or non-blocking may be identified. Reference FIG. 2 for an example of a correlation of mapped topological entities, service calls and application program interface (API) routes.

At 310, central processing unit (CPU) cycles of subtrees are marked for each entry point. For each application program interface (API) entry point, meta information may be marked. Meta information or metadata may be retrieved from the call control graph and the call control graph program flows. Meta information may be retrieved for each application program interface (API). The meta information retrieved from each application program interface (API) may include, for example, central processing unit (CPU) cycles, processing times, estimated maximum calls per second, blocking codes for network or storage accesses, threading or parallelism. Central processing unit (CPU) cycles may be marked for each entry point. The entry point may be determined by each application program interface (API). A processing time may be calculated for each subtree. A subtree may include a trace of each application program interface (API) and part of the entire program.

A learning model may be used to obtain meta information from a subtree or a subgraph. The subgraph for a node may have data represented as labels, such as central processing unit (CPU) cycles, memory, network read/write or disk read/write. A graph convolution operation may be used to take the average value of a node's features along with the features of the node's neighbors. Node neighbors, as distinct from image or text data, may be unordered and variable in size. For example, the subgraph node A and node X are processed through one or more a graph convolution networks (GCNs) followed by a pooling function before being processed by a multilayer perceptron (MLP) network. The output may provide the a softmax layer that represents meta information of the one or more nodes features.

At 312, topology graphs are constructed. An entire topology graph may be constructed using the correlating step, the mapping step and learning model. Additional information, such as performance meta data, may be marked for the nodes of the entire topology graph, such as an estimated latency for each link (i.e. edge), endpoint routes, resource consumption or an estimated processing time. The nodes represented may be service endpoints and the edges may be the dependencies between the endpoints. Additional information may be marked on the edges or links and may include information such as latency, application program interface (API) connections or round-trip time (RTT). An entire topology graph may be constructed by connecting subgraphs. Additional information may be marked on a subtree or an application program interface (API), such as estimated latency for each edge in the program. Reference FIG. 2 for an example of an entire topology graph of nodes, edges, routes and endpoints.

At 314, continuous topology information is validated. The entire constructed topology may be stored, and the information may be continuously monitored when new code is committed or when a configuration change occurs. The constructed topology may be validated with additional information, information changes and information updates. The updates or changes to the information may be reflected on the topology graph. For example, the entire topology service graph may be stored and maintained in a database and changes or amendments may be made to the topology graph over time. The changes or the augmented information to the stored topology graph may be made using, for example, updated data to static logs, configuration data, source code or pipeline data.

At 316, an additional or alternate embodiment allows inserting an active learning feedback model or component.

A continuous validation of the constructed topology graphs using updated static data, real-time information, subject matter expert (SME) feedback or updated temporal topology data may be used as an active learning component. The active learning component may leverage supervised and semi-supervised models to inject real-time information or expert feedback to be added as ground truth. Active learning may be used by obtaining, for example, subject matter expert (SME) or software developer feedback as ground truth during the model training, testing and validation phases. User knowledge or expert knowledge may be captured as real-time data.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
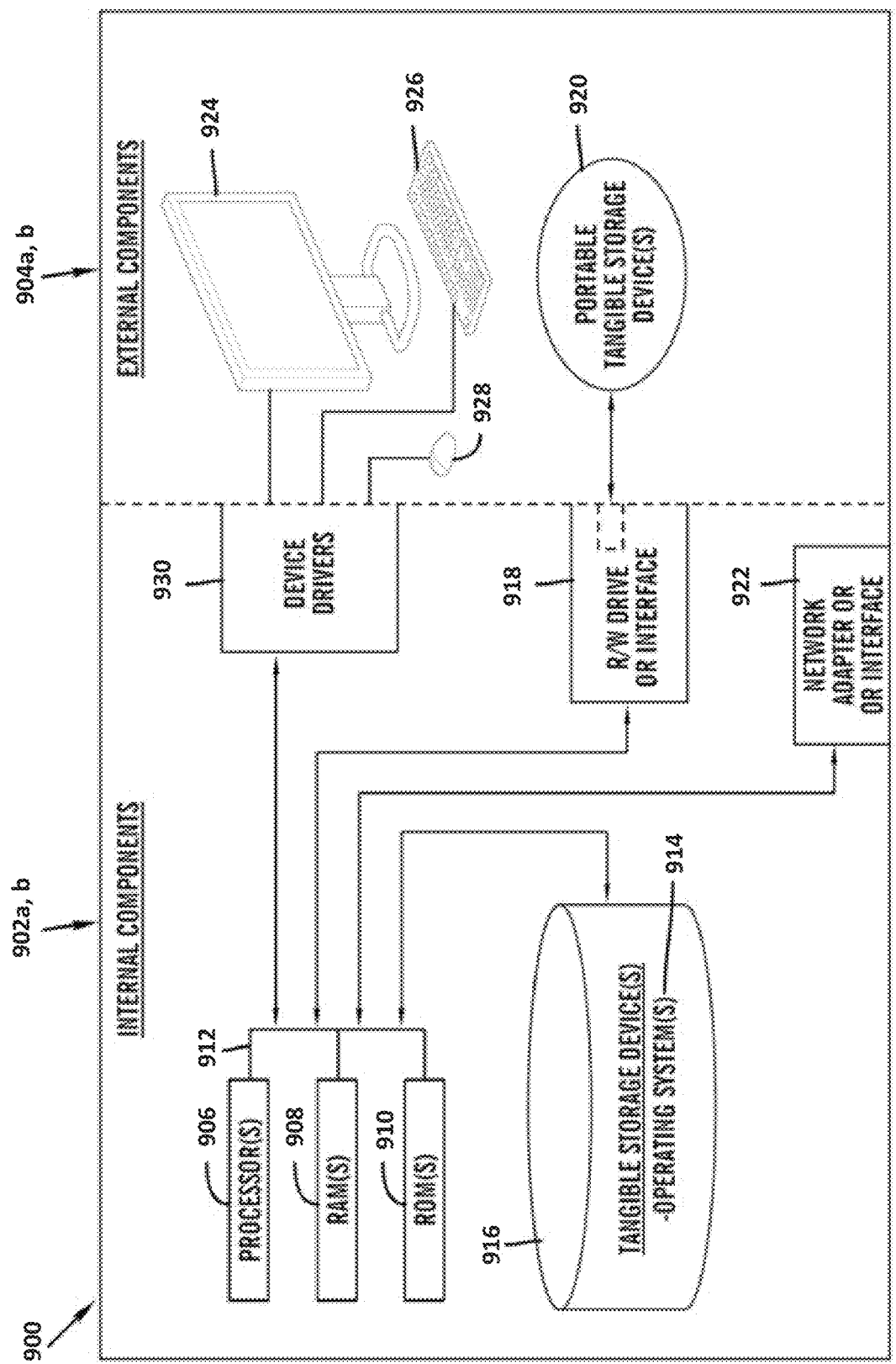
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the shiftleft topology program 110a in client computer 102, and the shiftleft topology program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the shiftleft topology program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the shiftleft topology program 110a in the computer 102 and the shiftleft topology program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the shiftleft topology program 110a in computer 102 and the shiftleft topology program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
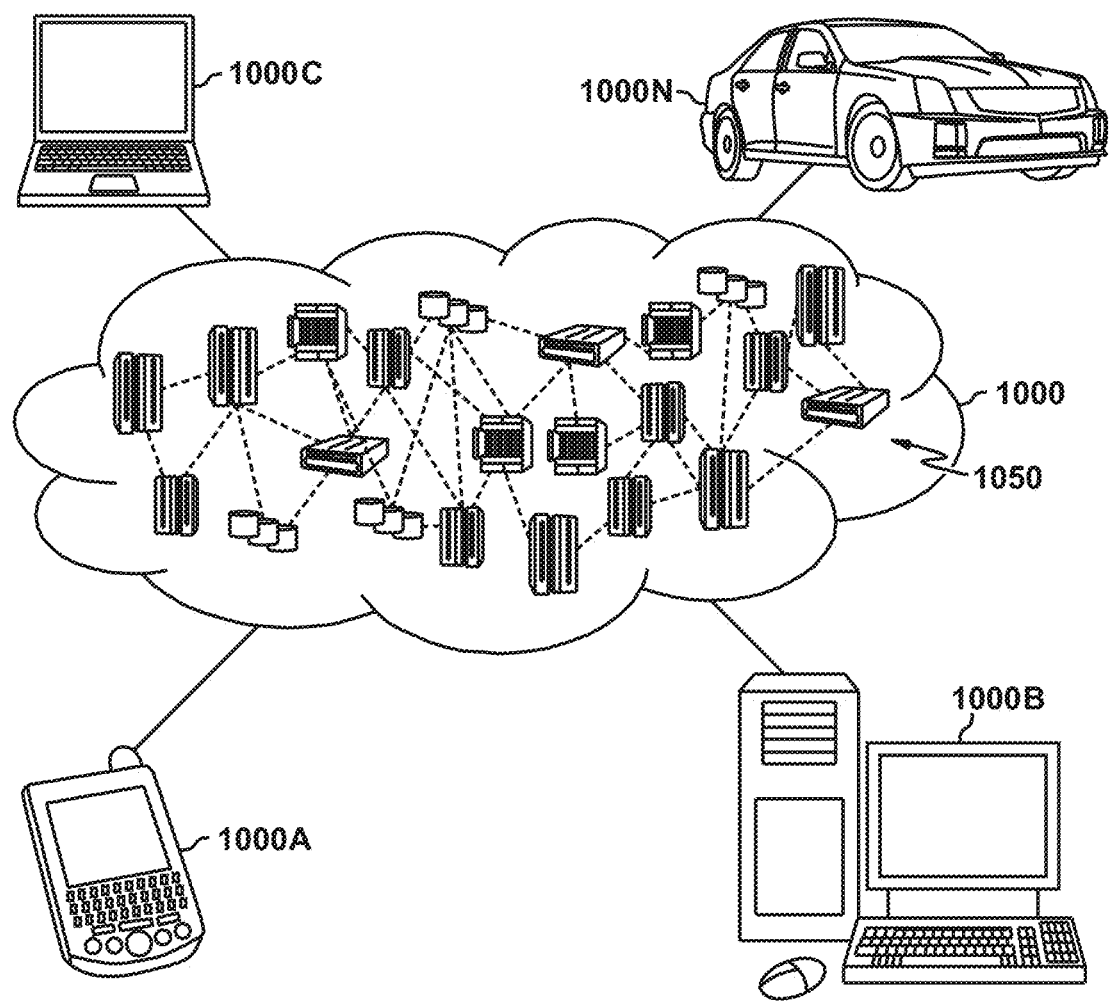
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1050 and cloud computing environment 1000 can communicate with any type of computerized device over any type of network and/or network addressable connection (e.g., using a web browser).

Figure 6:
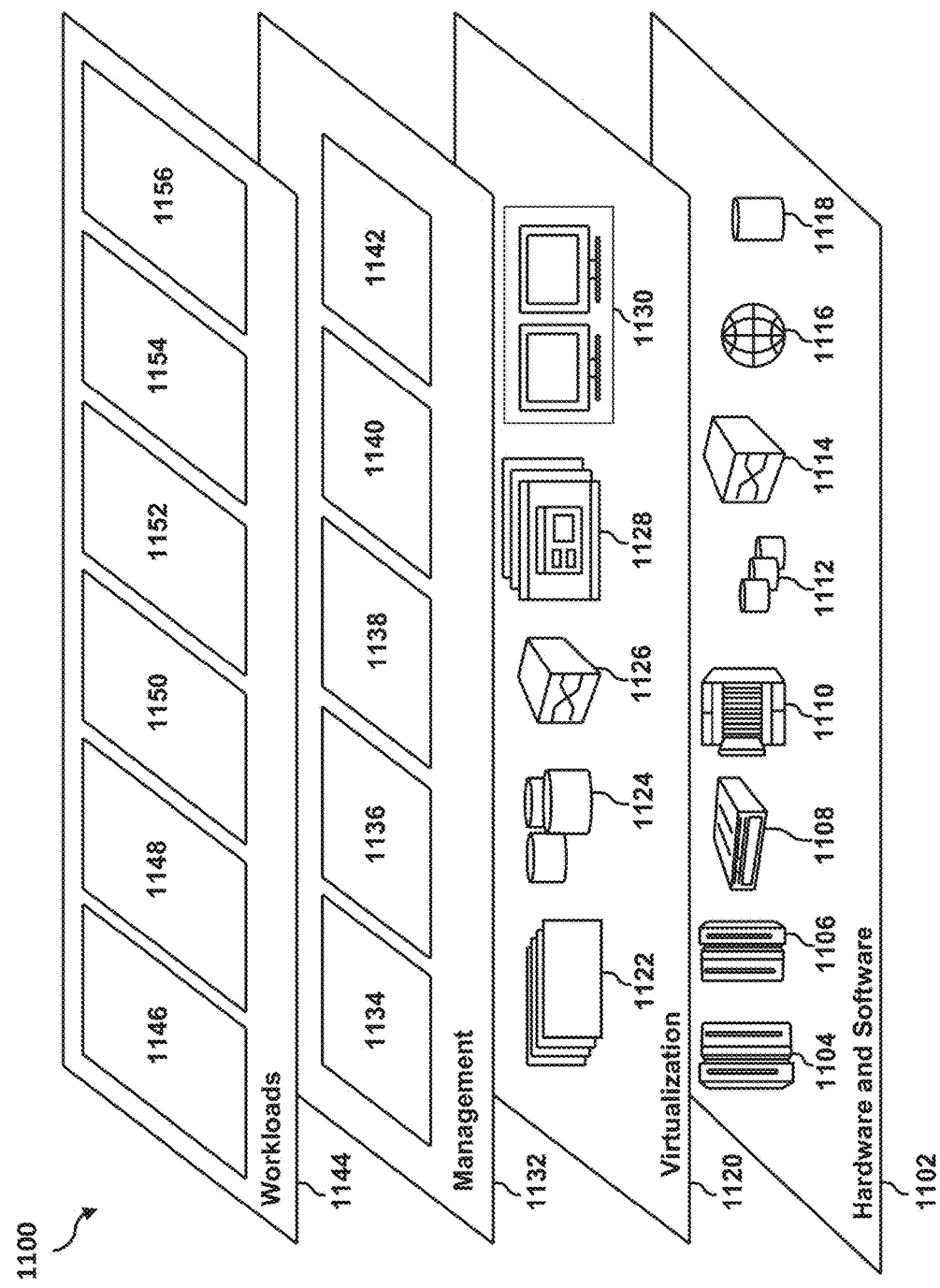
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and shiftleft topology construction 1156. A shiftleft topology program 110a, 110b provides a way to use machine learning to learn operational characteristics of microservices to construct a topological representation of services and service characteristics.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for implementing microservices using a shiftleft topology construction, the method comprises:
   determining, based on collected datasets, operational characteristics associated with different microservices in a microservice framework to create predictive results for constructing topologies for the different microservices, wherein the determining further comprises training and using a machine learning model to retrieve the collected datasets and learn the operational characteristics;
   extracting topological entities from the collected datasets using the machine learning (ML) model, wherein extracting the topological entities includes using machine learning algorithms associated with the machine learning model to identify keywords and topics that are distributed among the collected datasets and to determine pertinent topics among the identified topics associated with the different microservices;
   correlating a plurality of data from the topological entities, wherein the correlating further comprises matching a same topological entity from a plurality of different sources associated with the collected datasets and identifying a correlation of the topological entities between the different microservices and to application program interface (API) routes;
   mapping the topological entities, wherein the mapping further comprises mapping the topological entities to source code and identifying relationships from the mapped topological entities;
   marking entry points for a plurality of subgraphs of the topological entities;
   based on the correlating, the mapping, and the marking of the entry points for the topological entities, constructing an entire topology graph using the machine learning model, wherein nodes represent service endpoints and edges represent dependencies between the service endpoints; and
   implementing the microservices using the constructed entire topology graph, wherein the implementing further comprises using the machine learning model to detect changes to the microservices based on updated datasets, updating the constructed entire topology graph based on the updated datasets, and subsequently predicting construction of other entire topology graphs and dependencies between the microservices.

2. The method of claim 1, further comprising:
   updating the datasets using static data; and
   validating the updated datasets continuously.

3. The method of claim 2, wherein validating the updated datasets continuously occurs when a configuration change occurs.

4. The method of claim 1, further comprising:
   updating the datasets using real-time data from subject matter experts (SMEs) as an active learning feedback model; and
   validating the updated datasets continuously.

5. The method of claim 1, wherein extracting the topological entities includes extracting information from authorization entities, login entities, frontend entities, elastic search entities and graph database entities.

6. The method of claim 1, wherein marking the entry points for the plurality of subgraphs includes marking central processing units (CPUs) cycles of subgraphs for each of the entry points.

7. The method of claim 1, wherein a learning model is used to obtain meta information from the plurality of subgraphs.

8. A computer system for implementing microservices using a shiftleft topology construction, the computer system comprises:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   determining, based on collected datasets, operational characteristics associated with different microservices in a microservice framework to create predictive results for constructing topologies for the different microservices, wherein the determining further comprises training and using a machine learning model to retrieve the collected datasets and learn the operational characteristics;
   extracting topological entities from the collected datasets using the machine learning (ML) model, wherein extracting the topological entities includes using machine learning algorithms associated with the machine learning model to identify keywords and topics that are distributed among the collected datasets and to determine pertinent topics among the identified topics associated with the different microservices;
   correlating a plurality of data from the topological entities, wherein the correlating further comprises matching a same topological entity from a plurality of different sources associated with the collected datasets and identifying a correlation of the topological entities between the different microservices and to application program interface (API) routes;
   mapping the topological entities, wherein the mapping further comprises mapping the topological entities to source code and identifying relationships from the mapped topological entities;

marking entry points for a plurality of subgraphs of the topological entities;

based on the correlating, the mapping, and the marking of the entry points for the topological entities, constructing an entire topology graph using the machine learning model, wherein nodes represent service endpoints and edges represent dependencies between the service endpoints; and implementing the microservices using the constructed entire topology graph, wherein the implementing further comprises using the machine learning model to detect changes to the microservices based on updated datasets, updating the constructed entire topology graph based on the updated datasets, and subsequently predicting construction of other entire topology graphs and dependencies between the microservices.

9. The computer system of claim 8, further comprising:
updating the datasets using static data; and
validating the updated datasets continuously.

10. The computer system of claim 9, wherein validating the updated datasets continuously occurs when a configuration change occurs.

11. The computer system of claim 8, further comprising:
updating the datasets using real-time data from subject matter experts (SMEs) as an active learning feedback model; and
validating the updated datasets continuously.

12. The computer system of claim 8, wherein extracting the topological entities includes extracting information from authorization entities, login entities, frontend entities, elastic search entities and graph database entities.

13. The computer system of claim 8, wherein marking the entry points for the plurality of subgraphs includes marking central processing units (CPUs) cycles of subgraphs for each of the entry points.

14. The computer system of claim 8, wherein a learning model is used to obtain meta information from the plurality of subgraphs.

15. A computer program product for implementing microservices using a shiftleft topology construction, the computer program product comprises:
one or more computer-readable tangible storage media and program instructions stored on at least one of the one or more computer-readable tangible storage media, the program instructions executable by a processor to cause the processor to perform a method comprising:
determining, based on collected datasets, operational characteristics associated with different microservices in a microservice framework to create predictive results for constructing topologies for the different microservices, wherein the determining further comprises training and using a machine learning model to retrieve the collected datasets and learn the operational characteristics;

extracting topological entities from the collected datasets using the machine learning (ML) model, wherein extracting the topological entities includes using machine learning algorithms associated with the machine learning model to identify keywords and topics that are distributed among the collected datasets and to determine pertinent topics among the identified topics associated with the different microservices;

correlating a plurality of data from the topological entities, wherein the correlating further comprises matching a same topological entity from a plurality of different sources associated with the collected datasets and identifying a correlation of the topological entities between the different microservices and to application program interface (API) routes;

mapping the topological entities, wherein the mapping further comprises mapping the topological entities to source code and identifying relationships from the mapped topological entities;

marking entry points for a plurality of subgraphs of the topological entities;

based on the correlating, the mapping, and the marking of the entry points for the topological entities, constructing an entire topology graph using the machine learning model, wherein nodes represent service endpoints and edges represent dependencies between the service endpoints; and implementing the microservices using the constructed entire topology graph, wherein the implementing further comprises using the machine learning model to detect changes to the microservices based on updated datasets, updating the constructed entire topology graph based on the updated datasets, and subsequently predicting construction of other entire topology graphs and dependencies between the microservices.

16. The computer program product of claim 15, further comprising:
updating the datasets using static data; and
validating the updated datasets continuously.

17. The computer program product of claim 15, further comprising:
updating the datasets using real-time data from subject matter experts (SMEs) as an active learning feedback model; and
validating the updated datasets continuously.

18. The computer program product of claim 15, wherein extracting the topological entities includes extracting information from authorization entities, login entities, frontend entities, elastic search entities and graph database entities.

19. The computer program product of claim 15, wherein a learning model is used to obtain meta information from the plurality of subgraphs.

* * * * *